(12) United States Patent
Spillman et al.

(10) Patent No.: US 6,541,140 B1
(45) Date of Patent: *Apr. 1, 2003

(54) ELECTROCHEMICAL LITHIUM ION SECONDARY CELL HAVING MULTIPLATE ELECTRODES WITH DIFFERING DISCHARGE RATE REGIONS

(75) Inventors: David M. Spillman, Tonawanda, NY (US); Esther S. Takeuchi, East Amherst, NY (US)

(73) Assignee: Wilson Greatbatch Technologies, Inc., Clarence, NY (US)

( * ) Notice: Subject to any disclaimer, the term of this patent is extended or adjusted under 35 U.S.C. 154(b) by 175 days.

This patent is subject to a terminal disclaimer.

(21) Appl. No.: 09/632,821

(22) Filed: Aug. 7, 2000

(51) Int. Cl.$^7$ .................. H01M 10/04; H01M 10/40
(52) U.S. Cl. ................ 429/3; 429/9; 429/123; 29/623.1
(58) Field of Search ............... 429/3, 7, 9, 123, 429/128, 150; 29/623.1

(56) References Cited

U.S. PATENT DOCUMENTS

| 457,430 A | 8/1891 | Poudroux |
| 1,334,849 A | 3/1920 | Fraley |
| 2,118,712 A | 5/1938 | Oppenheim |
| 4,447,504 A | 5/1984 | Goebel ............................ 429/9 |
| 5,008,165 A | 4/1991 | Schmöde ...................... 429/94 |
| 5,439,756 A | 8/1995 | Anani et al. |
| 5,569,553 A | 10/1996 | Smesko et al. |
| 5,587,250 A | 12/1996 | Thomas et al. ................. 429/3 |
| 5,667,910 A | 9/1997 | Takeuchi et al. ............ 429/128 |
| 5,670,266 A | 9/1997 | Thomas et al. ................. 429/3 |
| 5,935,724 A | 8/1999 | Spillman et al. ............... 429/9 |
| 6,117,585 A | 9/2000 | Anani et al. |

FOREIGN PATENT DOCUMENTS

| EP | 0872908 A1 | * 10/1998 |
| EP | 0 989 624 A1 | 3/2000 |

OTHER PUBLICATIONS

Pistoia, G., ed. Lithium Batteries, New Materials, Developments and Perspectives. New York: Elsevier Science B.V., 1994, p. 43. No Month Available.*

* cited by examiner

Primary Examiner—Carol Chaney
Assistant Examiner—Susy Tsang-Foster
(74) Attorney, Agent, or Firm—Michael F. Scalise

(57) ABSTRACT

A secondary electrochemical cell comprising a medium rate electrode region intended to be discharged under a substantially constant drain and a high rate electrode region intended to be pulse discharged, is described. Both electrode regions share a common anode and are activated with the same electrolyte.

36 Claims, 1 Drawing Sheet

ELECTROCHEMICAL LITHIUM ION SECONDARY CELL HAVING MULTIPLATE ELECTRODES WITH DIFFERING DISCHARGE RATE REGIONS

BACKGROUND OF THE INVENTION

1. Field of the Invention

The present invention generally relates to the conversion of chemical energy to electrical energy. More particularly, the present invention relates to a secondary electrochemical cell dischargeable under both a constant discharge rate and a pulse discharge rate. Cardiac defibrillators present both electrical power requirements.

The constant discharge rate portion of the secondary cell of the present invention, referred to hereinafter as the medium rate region, preferably includes a high mass, low surface area lithium-retention cathode structure associated with a carbonaceous anode electrode in a side-by-side prismatic configuration. The pulse discharge rate portion of the secondary cell of the present invention, referred to hereinafter as the high rate region, preferably includes a high surface area lithium-retention cathode associated with a carbonaceous anode in a side-by-side prismatic configuration. Preferably the same anode structure is electrically associated with both the medium rate lithium-retention cathode region and the high rate lithium-retention cathode region housed within the same hermetically sealed casing. This structure defines what is meant by a medium rate region and a high rate region contained within the same secondary electrochemical cell.

2. Prior Art

Traditionally, cardiac defibrillator cells have been built using a multiplate electrode design. The cell designer must decide between providing additional electrochemically active components for increased mass and energy density or providing increased surface area for greater power density. Because of the wide disparity in the energy/power requirements placed upon a cardiac defibrillator cell or battery, that being intermittent low rate and high rate operation, a compromise is often decided upon. However, any design attempt to balance the energy/power requirements placed upon the cell or battery by the defibrillator device must not consequently produce unwanted self-discharge reactions. This compromise can provide for inefficiency and can decrease the overall gravimetric and volumetric energy density of the cell.

It is generally accepted that when low electrical currents are desired, the electrodes within a cell, whether of a primary or a secondary configuration, should have as much mass and as little surface area as possible. At the expense of power density, this provides for increased energy density while the low electrode surface area minimizes undesirable self-discharge reactions. Conversely, when larger electrical discharge currents are required, electrode surface area and power density are maximized at the expense of energy density and self-discharge rate.

The secondary cell of the present invention having an electrode assembly with differing discharge rate portions fulfills this need. The present secondary cell comprises regions containing a low interelectrode surface area in a side-by-side, prismatic configuration, preferred for routine monitoring by a device, for example a cardiac defibrillator, and regions containing a high interelectrode surface area in a side-by-side, prismatic configuration for use when high rate electrical pulse charging of capacitors is required with minimal polarization. It is believed that the present secondary electrochemical cell having electrodes with differing discharge rate regions represents a pioneering advancement wherein a medium discharge rate region and a high discharge rate region are provided within the same case for the purpose of having the cell supply at least two different electrical energy requirements.

SUMMARY OF THE INVENTION

The present invention provides an improved multiplate electrode design for an electrochemical lithium ion secondary cell dischargeable to provide background current intermittently interrupted or supplemented by current pulse discharge. The disclosed secondary cell is of a case-negative design in which the carbonaceous anode assembly is in electrical contact with the case. Two positive terminal pins are respectively connected to two independent lithium-retention cathode regions. One lithium-retention cathode region has a relatively low surface area and high density for providing low electrical current on the order of microamperes to milliamperes and the other lithium-retention cathode region has a relatively high surface area for providing high electrical current on the order of several hundred milliamperes to amperes.

The medium rate, constant discharge region of the present secondary cell comprises a lithium-retention cathode structure of one or more cathode plates flanked on either side by a carbonaceous anode. The lithium-retention cathode material, which preferably comprises an air stable lithiated compound, suitable conductive additive(s) and a binder, may be in a dry powder form and is pressed onto a conductive metal screen or foil. The carbonaceous anode preferably consists of carbon fibers, mesocarbon microbeads, graphitic carbon, non-graphitic carbon, petroleum coke, and other types of carbon that are also pressed onto a conductive metal screen or foil. A metallic lead connects the medium rate cathode region to a feedthrough terminal pin in the battery header which is insulated from the battery case by a glass-to-metal seal. The anode is either connected to the case resulting in a case-negative configuration or to another feedthrough pin also located in the header of the battery. A separator prevents short circuiting between the couple.

The high rate, pulse discharge region of the present secondary cell comprises a lithium-retention cathode structure of one or more cathode plates flanked on either side by the same anode that is coupled to the medium rate region. The interelectrode surface area of the high rate region is greater than that of the medium rate region to deliver high current pulses during device activation. Preferably the medium rate region contributes greater than 10% of the total energy density provided by the cell while having less than 50% of the total cathode surface area. Still more preferably, the medium rate region contributes greater than 10% of the total energy density provided by the cell while having less than 30% of the total cathode surface area.

Thus, the present invention offers the advantage of having both a medium rate, constant discharge or constant drain region and a high rate, pulse discharge region provided within the same secondary electrochemical cell. The electrochemical couple used for both the medium rate region and the high rate region is, for example, a carbon/lithiated oxide couple such as a carbon/$LiCoO_2$ couple. However, both discharge region couples need not necessarily be identical. Secondary electrochemical cells according to the present invention having medium rate and high rate discharge regions can be constructed and designed to meet the drain rate and current discharge requirements of a particular application.

These and other aspects of the present invention will become more apparent to those skilled in the art by reference to the following description and the appended drawings.

DETAILED DESCRIPTION OF THE PREFERRED EMBODIMENTS

Figure 1:
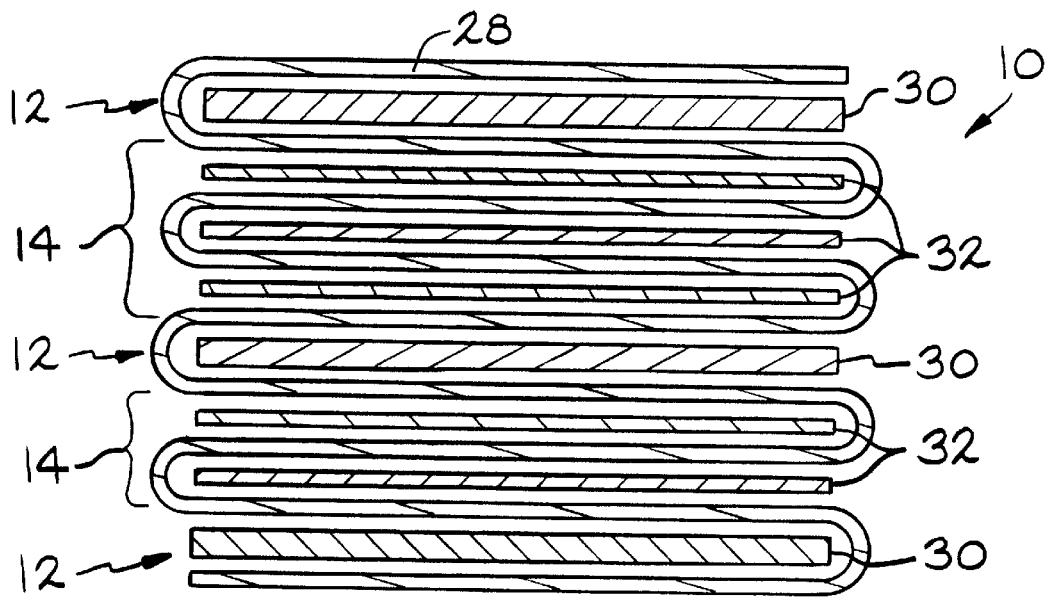
FIG. 1 is a diagrammatic view of a secondary electrochemical cell 10 with multiplate electrodes according to the present invention.
Figure 2:
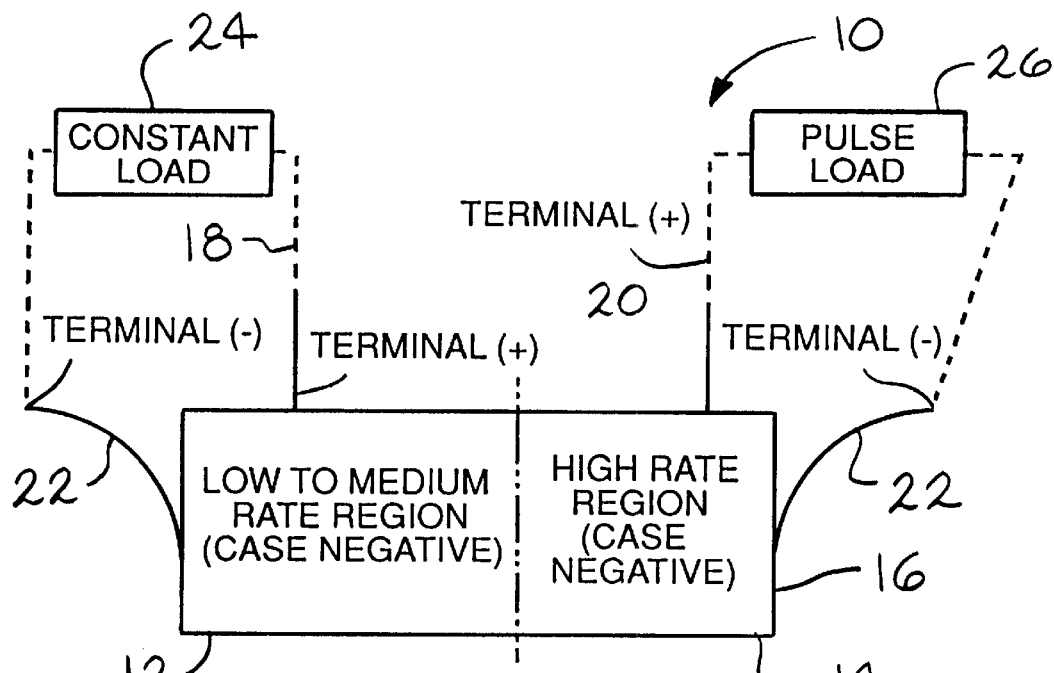
FIG. 2 is a schematic of the secondary electrochemical cell shown in FIG. 1.

Referring now to the drawings, FIGS. 1 and 2 show a secondary electrochemical cell 10 with multiplate electrodes constructed according to the present invention having both a medium rate region 12 and a high rate region 14 hermetically sealed within a metallic, prismatic casing 16. The medium rate region 12 preferably provides a relatively constant discharge current and the high rate region 14 preferably provides a high current pulse discharge power source. Both electrode regions are activated with the same electrolyte solution.

As diagrammatically shown in FIG. 2, the present secondary cell comprises two positive terminal leads 18, 20 and a common negative terminal lead 22. In other words, the medium rate region and the high rate region have separate and distinct positive terminals and the same negative terminal, i.e., the prismatic casing 16. Two different loads are applied to this battery. A constant resistance load 24 is connected to the positive terminal 18 and the negative terminal 22, i.e., the casing 16, and a constant current pulse "load" 26 is connected to the positive terminal 20 and the casing 16. The housing 16 is vacuum filled with a nonaqueous electrolyte common to both the medium rate region 12 and the high rate region 14. A device providing both a constant resistance load and a constant current pulse "load" is, for example, an implantable medical device such as a cardiac defibrillator.

More particularly, the carbonaceous active material for the anode electrode of the medium rate region and the high rate region of a secondary electrochemical cell with multiplate electrodes according to the present invention is any of the various forms of carbon (e.g., coke, graphite, acetylene black, carbon black, etc.) which are capable of reversibly retaining the lithium species. Graphite is preferred due to its relatively high lithium-retention capacity. Carbon fibers are particularly advantageous because they have excellent mechanical properties which permit them to be fabricated into rigid electrodes that are capable of withstanding degradation during repeated charge-discharge cycling. Moreover, their high surface area allows rapid charge/discharge rates. The carbon may be contacted to a conductive substrate such as by pressing, bonding and the like. A preferred carbonaceous material for the anode of the present secondary electrochemical cell is described in U.S. Pat. No. 5,443,928 to Takeuchi et al., which is assigned to the assignee of the present invention and incorporated herein by reference.

A typical anode electrode is fabricated by mixing about 90 to 99 weight percent graphite with 1 to 10 weight percent of a fluoro-resin binder. This mixture is rolled onto a current collector such as nickel, stainless steel, or copper foil or screen. The graphite electrode can be lithiated electrochemically using a lithium electrode, chemically, or via the cathode. The $Li_xC_6$ electrode can have an x range between 0.1 and 1.0.

As shown in FIG. 1, the anode for the medium rate region 12 and the high rate region 14 is a sheet 28 of the carbonaceous mixture, pressed or rolled on a metallic anode current collector, i.e., preferably comprising copper. The anode has an extended tab or lead of a metallic material, i.e., preferably nickel, integrally formed therewith, such as by welding. In this configuration, the lead is contacted by a weld to the conductive metal casing 16 serving as the negative terminal 22 in a case-negative configuration for both regions 12, 14. The casing 16 is preferably a prismatic housing that may comprise materials such as stainless steel, mild steel, nickel-plated mild steel, titanium or aluminum, but not limited thereto, so long as the metallic material is compatible for use with the other components of the cell.

The lithium-retention cathode material for both the medium rate and high rate regions may comprise a lithiated material that is stable in air and readily handled. Examples of such air-stable lithiated cathode materials include oxides, sulfides, selenides, and tellurides of such metals as vanadium, titanium, chromium, copper, molybdenum, niobium, iron, nickel, cobalt and manganese. The more preferred oxides include $LiNiO_2$, $LiMn_2O_4$, $LiCoO_2$, $LiCo_{0.92}Sn_{0.08}O_2$ and $LiCo_{1-}Ni_xO_2$.

In the case of the cathode structure for the medium rate region 12, the cathode active material may be in a dry powder form pressed onto a conductive metal screen. Aluminum is a suitable material for the cathode current collector. Preferably, prior to contact with the conductive current collector, the cathode active material in a finely divided form is mixed with conductive diluents and a binder material and then pressed onto the current collector screen. The binder material is preferably a thermoplastic polymeric binder material. The term thermoplastic polymeric binder material is used in its broad sense and any polymeric material which is inert in the cell and which passes through a thermoplastic state, whether or not it finally sets or cures, is included within the term "thermoplastic polymer". Representative materials include polyethylene, polypropylene and fluoropolymers such as fluorinated ethylene and fluorinated propylene, polyvinylidene fluoride (PVDF) and polytetrafluoroethylene (PTFE), PVDF being most preferred. Natural rubbers are also useful as the binder material with the present invention.

Suitable discharge promoter diluents include graphite powder, acetylene black powder and carbon black powder. Metallic powders such as aluminum and stainless steel are also useful as conductive diluents. In practice, about 80% to about 98%, by weight, of the lithium-retention cathode active material is mixed with about 1% to about 5% of the conductive diluents and about 1% to about 5% of the binder material. In some cases, no binder material or electronic conductor material is required to provide a similarly suitable cathode body. The cathode structure for the medium rate region may also be prepared by rolling, spreading or pressing a mixture of the materials mentioned above onto a suitable current collector.

The cathode structure for the medium rate region 12, prepared as described above, is preferably in the form of one or more cathode plates 30 operatively associated with the previously described anode sheet 28. The cathode plates 30 have a relatively low surface area and high density. For a carbon/LiCoO$_2$ cell, this electrode configuration provides low electrical current on the order of about 1 microampere to about 100 milliamperes corresponding to a C-Rate of about C/1,400,000 to about C/14. Preferably, at least one cathode plate 30 having a thickness of about 0.001 inches to about 0.020 inches is flanked on either side by oppositely positioned surfaces of the anode 28 prepared as described above.

The high rate region 14 of the present secondary cell comprises cathode plates 32 formed from a paste of lithium-retention cathode material, including binder and conductive additives, calendared into a free-standing structure that is subsequently dried and cut to shape. The shaped cathode structure having a thickness of about 0.0005 inches to about 0.010 inches is then pressed onto at least one side, and preferably both sides, of a current collector screen of a suitable material, such as aluminum, to provide the cathode structure in the form of plates 32 having a thickness of about 0.001 inches to about 0.020 inches. Preferably, at least one cathode plate 32 is flanked on either side by oppositely positioned surfaces of the carbonaceous anode 28 not facing the cathode plates 30 of the medium rate section 12. For a carbon/LiCoO$_2$ cell, this electrode configuration provides electrical current on the order of about 0.14 amps to about 14 amps corresponding to a C-Rate of about C/10 to about C/0.1 for the high rate region. A process for making cathode structures useful in the high rate region of the present multiplate electrode secondary cell is described in U.S. Pat. No. 5,435,874 to Takeuchi et al., which is assigned to the assignee of the present invention and incorporated herein by reference. An alternate preparation technique is to cast a slurry of the lithium-retention cathode material onto a surface-treated metal foil followed by drying and calendaring.

The lead 18 for the cathode plates 30 of the medium rate region 12 and the lead 20 for the cathode plates 32 of the high rate region 14 are insulated from the casing 16 by respective glass-to-metal seal/terminal lead feedthroughs. The glass used is of a corrosion resistant type having from between about 0% to about 50% by weight silicon such as CABAL 12, TA 23, CORNING 9013, FUSITE 425 or FUSITE 435. The positive terminal leads 18, 20 preferably comprise molybdenum although aluminum, nickel alloy, or stainless steel can also be used.

Either or both of the lithium-retention cathode plates 30, 32 and the carbonaceous anode sheet 28 for both the medium rate and high rate regions may be sealed in their own separator envelopes (not shown for clarity) to prevent direct physical contact between them. The separator is of an electrically insulative material to prevent an internal electrical short circuit between the active materials, and the separator material also is chemically unreactive with the anode and cathode active materials and both chemically unreactive with and insoluble in the electrolyte. In addition, the separator material has a degree of porosity sufficient to allow, flow therethrough of the electrolyte during the electrochemical reaction of the cell. Illustrative separator materials include woven and non-woven fabrics of polyolefinic fibers including polypropylene and polyethylene or fluoropolymeric fibers including polyvinylidene fluoride, polyethylenetetrafluoroethylene, and polyethylenechlorotrifluoroethylene laminated or superposed with a polyolefinic or fluoropolymeric microporous film, non-woven glass, glass fiber materials and, ceramic materials. Suitable microporous films include a polytetrafluoroethylene membrane commercially available under the designation ZITEX (Chemplast Inc.), a polypropylene membrane commercially available under the designation CELGARD (Celanese Plastic Company, Inc.) and a membrane commercially available under the designation DEXIGLAS (C. H. Dexter, Div., Dexter Corp.).

The multiplate secondary electrochemical cell of the present invention further includes a nonaqueous, ionically conductive electrolyte which serves as a medium for migration of ions between the anode and the cathode structures during the electrochemical reactions of the cell. The electrochemical reaction at both the medium rate and high rate regions involves conversion of ions in atomic or molecular forms which migrate from the anode to the cathode during discharging of the cell and from the cathode back to the anode during charging of the cell. Thus, nonaqueous electrolytes suitable for the present invention exhibit those physical properties necessary for ionic transport namely, low viscosity, low surface tension and wettability.

Suitable nonaqueous electrolytes are comprised of an inorganic salt dissolved in a nonaqueous solvent and more preferably an alkali metal salt dissolved in a mixture of aprotic organic solvents comprising a low viscosity solvent including organic esters, ethers and dialkyl carbonates, and mixtures thereof, and a high permittivity solvent including cyclic carbonates, cyclic esters and cyclic amides, and mixtures thereof. Suitable nonaqueous low viscosity solvents include tetrahydrofuran (THF), methyl acetate (MA), diglyme, triglyme, tetraglyme, dimethyl carbonate (DMC), diethyl carbonate (DEC), dipropyl carbonate (DPC), methyl ethyl carbonaate (MEC), methyl propyl carbonate (MPC), ethyl propyl carbonate (EPC), 1,2-dimethoxyethane (DME), and others. Preferred high permittivity solvents include propylene carbonate (PC), ethylene carbonate (EC), butylene carbonate (BC), acetonitrile, dimethyl sulfoxide, dimethyl formamide, dimethyl acetamide, γ-butyrolactone (GBL) and N-methylpyrrolidinone (NMP) and others.

Known lithium salts that are useful as a vehicle for transport of alkali metal ions from the anode to the cathode and back again include LiPF$_6$, LiBF$_4$, LiAsF$_6$, LiSbF$_6$, LiClO$_4$, LiAlCl$_4$, LiGaCl$_4$, Li$_2$O, LiNO$_3$, LiC(SO$_2$CF$_3$)$_3$, LiN(SO$_2$CF$_3$)$_2$, LiSCN, LiO$_3$SCF$_2$CF$_3$, LiC$_6$F$_5$SO$_3$, LiO$_2$CCF$_3$, LiSO$_3$F, LiB(C$_6$H$_5$)$_4$ and LiCF$_3$SO$_3$, and mixtures thereof. Suitable salt concentrations typically range between about 0.8 to 1.5 molar, and a preferred electrolyte for a rechargeable lithium ion cell according to the present invention includes LiAsF$_6$ or LiPF$_6$ dissolved in an equilibrated mixture of ethyl methyl carbonate, dimethyl carbonate, diethyl carbonate and ethylene carbonate.

The rechargeable cell of the present invention is initially in a discharged state and lithium contained within the cathode is intercalated into the anode by applying an externally generated electrical potential to charge the cell. The applied electrical potential serves to draw the alkali metal ions from the cathode material, through the electrolyte and into the carbonaceous anode to saturate the carbonaceous material comprising the anode. The cell is then provided with an electrical potential and is discharged in a normal manner.

The casing header comprises a metallic lid (not shown) having a sufficient number of openings to accommodate the glass-to-metal seal/terminal lead feedthroughs for the cathode plates 30, 32 of the medium and high rate regions 12, 14, respectively. An additional opening is provided for electrolyte filling. The casing header comprises elements having compatibility with the other components of the secondary electrochemical cell and is resistant to corrosion. The present secondary cell is thereafter filled with the electrolyte solution described hereinabove and hermetically sealed such as by close welding a stainless steel plug over the fill hole, but not limited thereto.

An exemplary secondary electrochemical cell dischargeable under both a constant discharge rate and a pulse discharge rate according to the present invention may be constructed having a capacity (Qa) of the anode and a capacity (Qc) of the cathode of the high rate region and of the medium rate region as follows:

An exemplary condition consists of the respective high rate region and medium rate region of the cathode each having a Qa:Qc ratio greater than 0.8:1.0. In this case, the Qa:Qc capacity ratio for both the medium rate and high rate regions may be as high as 1.5:1.0 or as low as 0.8:1.0.

The overall cell balance depends on the ratio of capacity for the high rate region 14 to the medium rate region 12 of the cell. The capacity ratio of the medium rate region 12 to the high rate region 14 is about 0.05 to about 0.5. Preferably, the high rate region 14 is less than 50% of the total cell capacity while the medium rate region 12 comprises greater than 50% of the total cell capacity. In the case of a 50:50 capacity ratio between the high rate and medium rate regions of the total cell capacity, the respective Qa:Qc ratios are shown in Table 1.

TABLE 1

| High Rate Region (Qa:Qc) | Medium Rate Region (Qa:Qc) | Total Cell Capacity (Qa:Qc) |
|---|---|---|
| 1.1:1.0 | 1.0:1.0 | 1.05:1.0 |

It is appreciated that various modifications to the inventive concepts described herein may be apparent to those skilled in the art without departing from the spirit and scope of the present invention defined by the hereinafter appended claims.

What is claimed is:

1. A secondary electrochemical cell, which comprises:
   (a) first electrode provided in a folded, accordion pleated shape and comprising a first electrode active material;
   (b) a second electrode electrically associated with the first electrode to provide at least a first region and a second region of the cell, wherein the first region and the second region of the cell are provided by respective first and second structures of the second electrode disposed between the folds of the first electrode with at least a portion of the first electrode in a face-to-face relationship with at least one side of each of the first and second structures of the second electrode, and wherein one of the first electrode and the second electrode is a carbonaceous material and the other of the first electrode and the second electrode is a lithium-retention material; and
   (c) an electrolyte activating and operatively associating the first electrode and second electrode such that the first region and the second region are dischargeable independent of each other to provide separate and independent sources of electrical energy.

2. The electrochemical cell of claim 1 wherein the first electrode is an anode and wherein the first region of the cell comprises a first cathode of a first lithium-retention material electrically associated with the anode and the second region of the cell comprises a second cathode of a second lithium-retention material electrically associated with the anode.

3. The electrochemical cell of claim 2 wherein the anode and the associated first cathode provide electrical energy at a first current and wherein the anode and the associated second cathode provide electrical energy at a second current greater than the first current.

4. The electrochemical cell of claim 2 wherein the anode associated with the first cathode is dischargeable under a substantially constant discharge rate and the anode associated with the second cathode is dischargeable under a current pulse discharge appilication.

5. The electrochemical cell of claim 4 wherein the anode is electrically connected to a casing to provide a case-negative configuration for the cell.

6. The electrochemical cell of claim 4 wherein both the first and second cathodes are electrically connected to respective cathode terminals electrically insulated from a casing.

7. The electrochemical cell of claim 2 wherein the first and second lithium-retention materials are the same.

8. The electrochemical cell of claim 2 wherein the first and second lithium-retention materials are dissimilar.

9. The electrochemical cell of claim 2 wherein the first and second lithium-retention materials of the first and second cathodes are selected from the group consisting of $LiNiO_2$, $LiMn_2O_4$, $LiCoO_2$, $LiCo_{0.92}Sn_{0.08}O_2$, $LiCo_{1-x}Ni_xO_2$, and mixtures thereof.

10. The electrochemical cell of claim 2 wherein both the first and second cathodes comprise from between about 80 weight percent to about 98 weight percent of the respective first and second lithium-retention materials.

11. The electrochemical cell of claim 2 wherein at least one of the first and second cathodes further comprises a binder material and conductive additives.

12. The electrochemical cell of claim 11 wherein the binder material is a thermoplastic material.

13. The electrochemical cell of claim 11 wherein the conductive additives are selected from the group consisting of carbon black, graphite powder, acetylene black, aluminum powder, stainless steel powder, and mixtures thereof.

14. The electrochemical cell of claim 2 wherein the first and second cathodes comprise about 1 to 5 weight percent of a conductive additive, about 1 to 5 weight percent of a binder material and about 80 to 98 weight percent of the respective first and second lithium-retention materials.

15. The electrochemical cell of claim 2 wherein the first and second cathodes are in the form of plates, each having a thickness in the range of from about 0.001 inches to about 0.020 inches.

16. The electrochemical cell of claim 15 wherein a first electrochemical couple comprises portions of the anode disposed adjacent to opposite sides of the first cathode and wherein a second electrochemical couple comprises portions of the anode disposed adjacent to opposed sides of the second cathode.

17. The electrochemical cell of claim 2 wherein a casing houses the anode and the associated first cathode as a first electrochemical couple dischargeable under a substantially constant discharge application, the first couple comprising:
   i) the anode comprising a carbonaceous material; and
   ii) the first lithium-retention material of the first cathode selected from the group consisting of $LiNiO_2$, $LiMn_2O_4$, $LiCoO_2$, $LiCo_{0.92}Sn_{0.08}O_2$, $LiCo_{1-x}Ni_xO_2$, and mixtures thereof;
   and wherein the casing further houses the anode and the associated second cathode as a second electrochemical couple dischargeable under a current pulse discharge application, the second couple comprising:
   i) the anode; and
   ii) the second lithium-retention material of the second cathode selected from the group consisting of $LiNiO_2$, $LiMn_2O_4$, $LiCoO_2$, $LiCo_{0.92}Sn_{0.08}O_2$, $LiCo_{1-x}Ni_xO_2$, and mixtures thereof.

18. The electrochemical cell of claim 1 wherein the first region contributes greater than 10% of the total energy density of the cell while the first structure of the second electrode provides less than 50% of the total surface area of the second electrode.

19. The electrochemical cell of claim 1 wherein the first electrode is the anode and the second electrode is the cathode.

20. The electrochemical cell of claim 1 wherein the first region of the cell has greater than 10% of the total energy density of the cell while the first structure of the second electrode provides less than 30% of the total surface area of the second electrode.

21. The electrochemical cell of claim 1 including a conductive casing serving as a terminal for the first electrode and wherein the first structure of the second electrode is connected to a first terminal lead and the second structure of the second electrode is connected to a second terminal lead, the first and second terminal leads being insulated from the casing and from each other.

22. The electrochemical cell of claim 1 wherein the first electrode is a carbonaceous anode and the second electrode is a lithium-retention cathode and the first region of the cell is dischargeable at a relatively low electrical current of about 1 microampere to about 100 milliamperes corresponding to a C-rate of about C/1,400,000 to about C/14, and wherein the second region of the cell is dischargeable at a relatively high electrical current of about 0.14 amperes to about 14 amperes corresponding to a C-rate of about C/10 to about C/0.1.

23. The electrochemical cell of claim 1 wherein the first electrode is a carbonaceous anode and the second electrode is a lithium-retention cathode and the first region and the second region each contribute about 50% of the total cell capacity and a ratio of a capacity (Qa) of the first electrode to a capacity (Qc) of the second electrode is greater than about 0.8:1.0.

24. The electrochemical cell of claim 1 wherein a ratio of a capacity of the first electrode to a capacity of the second electrode in the first region of the cell is about 0.8:1.0 to about 1.5:1.0.

25. The electrochemical cell of claim 1 wherein a ratio of a capacity of the first electrode to a capacity of the second electrode in the second region of the cell is about 0.8:1.0 to about 1.5:1.0.

26. The electrochemical cell of claim 1 wherein a capacity ratio of the first region to the second region is about 0.05 to about 0.5.

27. The electrochemical cell of claim 26 wherein a ratio of a capacity of the first electrode to a capacity of the second electrode in the first region of the cell is about 0.8:1.0 to about 1.5:1.0, and wherein a ratio of the capacity of the first electrode to the capacity of the second electrode in the second region is about 0.8:1.0 to about 1.5:1.0.

28. The electrochemical cell of claim 1 wherein the first structure of the second electrode is provided at least in part by a second electrode active material and wherein the second structure of the second electrode is provided at least in part by a third electrode active material.

29. The electrochemical cell of claim 28 wherein the second and third electrode active materials are the same.

30. The electrochemical cell of claim 28 wherein the second and third electrode active materials are dissimilar.

31. The electrochemical cell of claim 1 wherein the first and second structures comprise respective first and second plates having opposed major surfaces disposed between the folds of the first electrode such that a portion of the first electrode is in a face-to-face relationship with the opposed major surfaces of both the first and second plates to provide the respective first and second regions of the cell.

32. The electrochemical cell of claim 1 wherein the electrolyte includes an alkali metal salt selected from the group consisting of $LiPF_6$, $LiBF_4$, $LiAsF_6$, $LiSbF_6$, $LiClO_4$, $LiAlCl_4$, $LiGaCl_4$, $Li_2O$, $LiNO_3$, $LiC(SO_2CF_3)_3$, $LiN(SO_2CF_3)_2$, $LiSCN$, $LiO_3SCF_2CF_3$, $LiC_6F_5SO_3$, $LiO_2CCF_3$, $LiSO_3F$, $LiB(C_6H_5)_4$, $LiCF_3SO_3$, and mixtures thereof.

33. The electrochemical cell of claim 1 wherein the electrolyte includes at least one nonaqueous solvent selected from the group consisting of tetrahydrofuran, dimethyl carbonate, ethyl methyl carbonate, diethyl carbonate, propylene carbonate, methyl acetate, acetonitrile, dimethyl sulfoxide, dimethyl formamide, dimethyl acetamide, ethylene carbonate, diglyme, triglyme, tetraglyme, 1,2-dimethoxyethane, γ-butyrolactone, N-methyl-pyrrolidinone, and mixtures thereof.

34. A method for discharging an electrochemical cell to provide separate and independent sources of electrical energy, comprising the steps of:
   a) providing a first electrode in a folded, accordion pleated shape and comprising a first electrode active material;
   b) providing a second electrode electrically associate with the first electrode to provide at least a first region and a second region of the cell, wherein the first region and the second region of the cell are provided by respective first and second structures of the second electrode disposed between the folds of the first electrode with at least a portion of the first electrode in a face-to-face relationship with at least one side of each of the first and second structures of the second electrode, and wherein one of the first electrode and the second electrode is a carbonaceous material and the other of the first electrode and the second electrode is a lithium-retention material;
   c) activating the operatively associated first electrode and the second electrode with an electrolyte solution; and
   d) discharging the first region and the second region of the cell independent of each other to provide separate and independent sources of electrical energy.

35. The method of claim 34 including providing the first electrode as an anode and further including providing the first region of the cell comprising a first cathode of a first lithium-retention material and the second region of the cell comprising a second cathode of a second lithium-retention material.

36. The method of claim 35 including providing a casing housing the anode and the first cathode as a first electrochemical couple dischargeable under a substantially constant discharge application, and further providing the first electrochemical couple comprising:
   i) the anode comprising the carbonaceous material; and
   ii) the first lithium-retention material of the first cathode selected from the group consisting of $LiNiO_2$, $LiMn_2O_4$, $LiCoO_2$, $LiCo_{0.92}Sn_{0.08}O_2$, $LiCo_{1-x}Ni_xO_2$, and mixtures thereof;
   and providing the anode and the second cathode as a second electrochemical couple housed within the casing and dischargeable under a current pulse discharge application, and further providing the second electrochemical couple comprising:
   i) the anode; and
   ii) the second lithium-retention material of the second cathode selected from the group consisting of $LiNiO_2$, $LiMn_2O_4$, $LiCoO_2$, $LiCo_{0.92}Sn_{0.08}O_2$, $LiCo_{1-x}Ni_xO_2$, and mixtures thereof.

* * * * *